US 11,396,957 B2

(12) United States Patent
Sabin et al.

(10) Patent No.: US 11,396,957 B2
(45) Date of Patent: Jul. 26, 2022

(54) CHILD-RESISTANT DRAIN VALVE

(71) Applicant: LVD Acquisition, LLC, Columbus, OH (US)

(72) Inventors: Stephen John Sabin, Ballina (IE); John Francis Kennedy, Tubbercurry (IE)

(73) Assignee: LVD AQUISITION, LLC, Columbus, OH (US)

( * ) Notice: Subject to any disclaimer, the term of this patent is extended or adjusted under 35 U.S.C. 154(b) by 0 days.

(21) Appl. No.: 17/277,137

(22) PCT Filed: Sep. 19, 2019

(86) PCT No.: PCT/US2019/051892
§ 371 (c)(1),
(2) Date: Mar. 17, 2021

(87) PCT Pub. No.: WO2020/061287
PCT Pub. Date: Mar. 26, 2020

(65) Prior Publication Data
US 2022/0049791 A1    Feb. 17, 2022

Related U.S. Application Data

(60) Provisional application No. 62/733,176, filed on Sep. 19, 2018.

(51) Int. Cl.
*F16K 35/06* (2006.01)
*B67D 3/00* (2006.01)
*B65D 47/12* (2006.01)

(52) U.S. Cl.
CPC ............ *F16K 35/06* (2013.01); *B65D 47/125* (2013.01); *B67D 3/0061* (2013.01)

(58) Field of Classification Search
CPC .... B65D 1/0246; B65D 47/12; B65D 47/121; B65D 47/125; B65D 47/126; B65D 47/14;
(Continued)

(56) References Cited

U.S. PATENT DOCUMENTS 1,058,277 A    4/1913 Tucker
1,844,085 A    2/1932 Young et al.
(Continued)

FOREIGN PATENT DOCUMENTS

AU          674143       12/1996
GB          344257       3/1931

*Primary Examiner* — Kevin F Murphy
*Assistant Examiner* — Jonathan J Waddy
(74) *Attorney, Agent, or Firm* — Standley Law Group LLP; Jeffrey S. Standley; Stephen L. Grant

(57) ABSTRACT

A safety device allows selective opening or closing of a drain opening of a tank, to render such action more difficult for a child. The device has a body, a plug, a means for restricting axial movement of the plug in a conduit that runs through the body, and, optionally, a tether. The conduit is adapted for engagement in the drain opening. The plug is frictionally engaged in the conduit. The means for restricting axial movement has complementary elements disposed on the plug and on the body, such that, in a first rotational position, the plug is axially retained relative to the conduit and, in a second rotational position, the plug is not restricted from axial movement out of the conduit. The tether attaches to the plug and the body to keep the plug proximate to the body.

5 Claims, 8 Drawing Sheets

(58) Field of Classification Search
CPC .. B65D 47/141; B65D 47/145; B65D 47/146; B65D 55/16; B65D 81/26; B65D 81/261; B65D 81/262; B65D 2251/00; B65D 2501/24127; B65D 2501/24929; B65D 2519/008; B67D 3/0061; F16K 35/06; F16K 35/10
USPC ...... 138/94; 220/288, 293, 570; 222/153.09, 222/153.1, 563
See application file for complete search history.

(56) References Cited

U.S. PATENT DOCUMENTS

| | | | |
|---|---|---|---|
| 1,993,321 A | 3/1935 | Ferguson | |
| 2,722,337 A * | 11/1955 | Lindsay | B60K 15/0406 220/293 |
| 2,866,572 A * | 12/1958 | Llewhellin | B65D 55/165 220/293 |
| 3,070,251 A * | 12/1962 | Mangravite | B65D 47/125 215/357 |
| 3,469,748 A * | 9/1969 | Meyers | B65D 45/32 222/563 |
| 4,733,415 A | 3/1988 | Ippoliti | |
| 6,019,348 A * | 2/2000 | Powell | B60K 15/04 141/198 |
| 6,732,674 B2 * | 5/2004 | Gustin | A01K 7/00 119/72 |
| 7,487,879 B2 * | 2/2009 | Yoshida | B60K 15/0406 220/304 |
| 2004/0262312 A1 * | 12/2004 | Hagano | B60K 15/0406 220/293 |
| 2014/0263155 A1 * | 9/2014 | Szczesniak | B65D 41/0457 215/252 |
| 2016/0106969 A1 * | 4/2016 | Neftel | A61M 39/165 29/426.1 |
| 2017/0073948 A1 | 3/2017 | Terrell | |

* cited by examiner

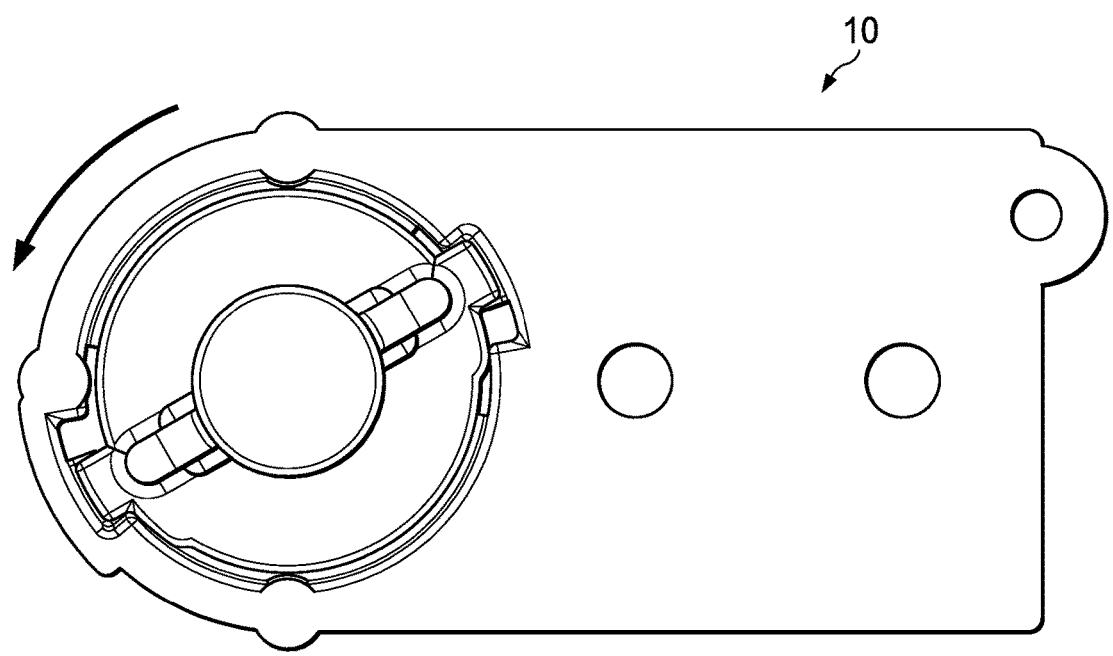
FIG. 2E
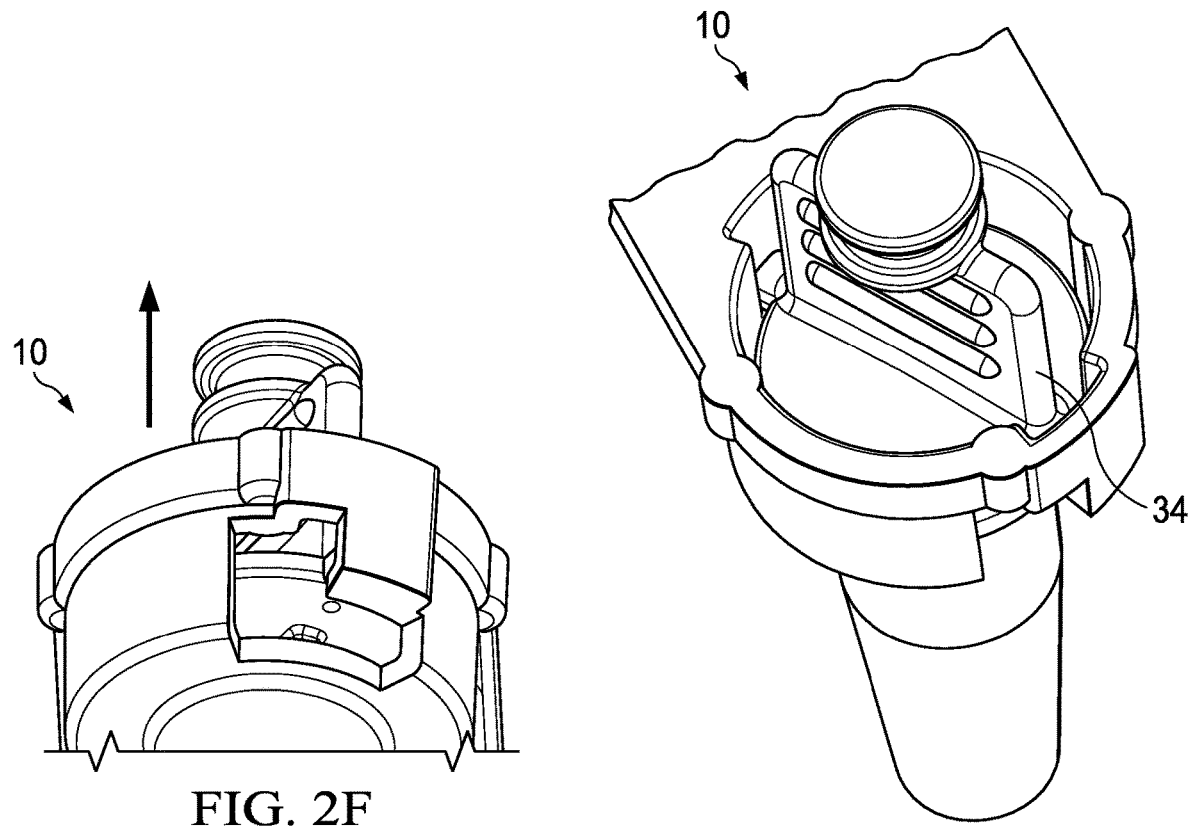
FIG. 2F
FIG. 2G

CHILD-RESISTANT DRAIN VALVE

CROSS-REFERENCE TO RELATED APPLICATIONS

This application is a non-provisional patent application under the Patent Cooperation Treaty, based on U.S. provisional patent application 62/733,176, filed on 19 Sep. 2018, which is incorporated by reference as if fully recited herein.

TECHNICAL FIELD

The disclosed embodiments of the present invention relate to a valve, particularly a valve used to drain a tank for storing heated or cooled water, such as with a water cooler or heated beverage maker. A valve implementing the inventive concept requires a coordinated effort to open the valve, making it more resistant to tampering by a child. An additional feature keeps the parts of the drain valve together while the valve is open, helping to prevent loss of the parts.

BACKGROUND

Water-dispensing devices provide a temperature-controlled source of drinking water. In general, such a device includes at least one of a cooling tank and a hot water tank. To repair, clean or sanitize such a water-storage tank, water contained in the tank must be drained, and such a drain is typically located low on the tank, to allow gravity draining, but putting the drain within reach of almost anyone, regardless of height, although the drain is also usually placed on a rear surface of the water-dispensing device. Children, with their inherent curiosity, can be injured by hot water if they open such a drain valve on a hot water tank and can cause water damage or electrical shock hazard if they open a cooled water tank.

Typical drain valve designs of the prior art involve a valve body, a plug and a plug cap. Of these, the valve body is inserted into an orifice in the tank body. In some situations, the valve body is affixed in the orifice, such as by thermal welding or by an adhesive. In other situations, the valve body is removably received into the orifice, such as by complementary threading, especially with the valve body operating as the male member. A portion of the valve body extends outwardly from the orifice, in the form of a male member with external threading. An opening in this extending male member provides fluid communication to the interior of the tank. The plug can be inserted into the opening, where it is retained generally by a frictional fit, although the plug cap is also used to secure the plug. Typically, the plug cap provides internal threading to complement external threading on the male member.

A drain valve of this type also presents a concern about lost or misplaced pieces, particularly, the plug, which may also provide a choking hazard to a child.

The prior art has an unmet need to provide a device that is not easily operated by a child, but which is easy for an adult to engage and operate, especially considering that the location of the device may not be convenient to the adult.

SUMMARY OF THE INVENTION

These and other unmet needs of the prior art are met by a drain valve device that requires a multiple-step user operation to be engaged or disengaged, and is designed to keep component parts of the drain valve attached together to a body after the drain valve has been disengaged and removed from the body.

In one embodiment, the device for selectively opening or closing a drain opening of a tank for containing a liquid comprising a body, adapted for engagement into the drain opening, the body having a conduit running therethrough. The device also comprises a plug, sized and shaped for frictional engagement in the conduit. A means for restricting axial movement of the plug in the conduit is disposed on each of the plug and the body, in complementary manner, such that, in a first rotational position, the plug is axially retained relative to the conduit and, in a second rotational position, the plug is not restricted from axial movement out of the conduit. The device also comprises a tether, adapted at a first end to be retained on the plug and adapted at a second end to be retained by the body.

In some of the embodiments, the means for restricting axial movement of the plug in the body comprises a cage formed in the body at the first end thereof, the cage provided with a plurality of openings and detents that engage the plug and limit rotation of the plug therein.

The means also comprises at least two tangs formed on the plug that engage the openings in the cage as a complementary portion of the means when the plug is inserted in the body.

In many embodiments, the plug comprises an elastomeric material.

The process of engaging or disengaging the plug from the body requires at least one clockwise rotation and at least one counterclockwise rotation of the plug in the body to engage or disengage the tangs of the plug in the openings of the cage.

In some embodiments, the device also comprises an annular cap, having a through-hole from which an end of the plug extends, the annular cap comprising means for co-acting with the body to engage the cap in the body, such that, in a first rotational position, the cap is axially retained relative to the conduit and, in a second rotational position, the cap is not restricted from axial movement away from the body. In this embodiment, the tether and the plug co-act to retain the annular cap between the plug and the body.

In many of these embodiments, the annular cap comprises a thermoplastic.

In many of the embodiments, the annular cap is divided by radial cuts into a plurality of sectors, such that, when the annular cap in positioned atop the plug, manual compression of at least two sectors by a user, followed by rotation of the annular cap, causes co-rotation of the plug in the cage.

In the embodiments, the body preferably has an external diameter that decreases from a first end, into which the plug is inserted, to a second end.

In many of the embodiments the body comprises a thermoplastic material.

In many of the embodiments, the device further comprises a rectangular flange that extends radially from the body, especially where an opening in the rectangular flange provides an anchor point for an end of the tether.

BRIEF DESCRIPTION OF THE DRAWINGS

A better understanding of the disclosed embodiments will be obtained from the detailed description and the accompanying drawings, wherein identical reference characters refer to identical parts and in which:

FIG. 2E is a front perspective view of the FIG. 1 embodiment wherein the drain plug is positioned for removal;

FIG. 2F is a bottom perspective view of the FIG. 2D embodiment;

FIG. 2G is a top perspective view of the FIG. 1 embodiment wherein the drain plug is being removed;

DETAILED DESCRIPTION OF A PREFERRED EMBODIMENT

Figure 1A:
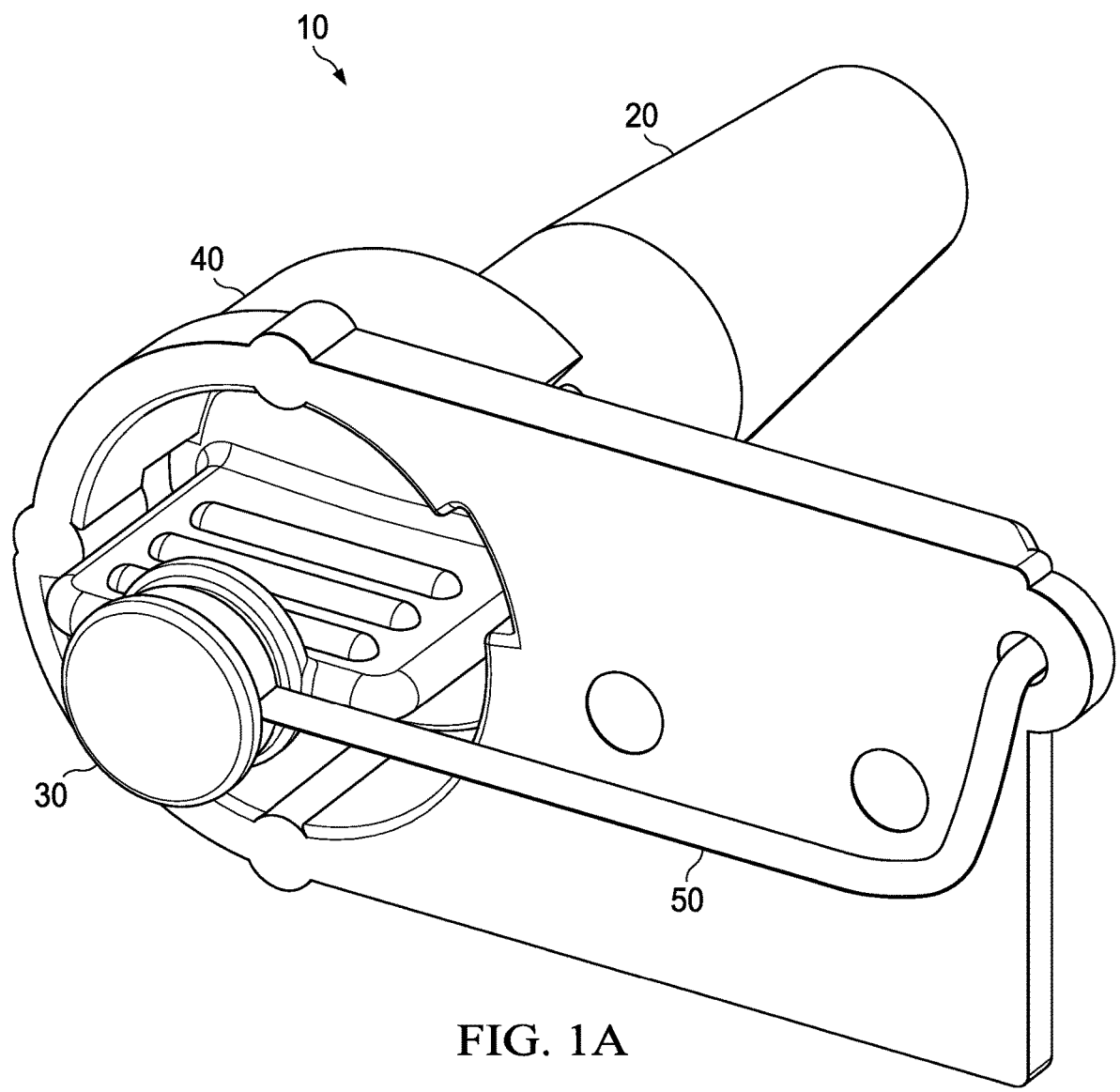
FIG. 1A is a front perspective view of an exemplary embodiment of a child-resistant drain valve.
Figure 1B:
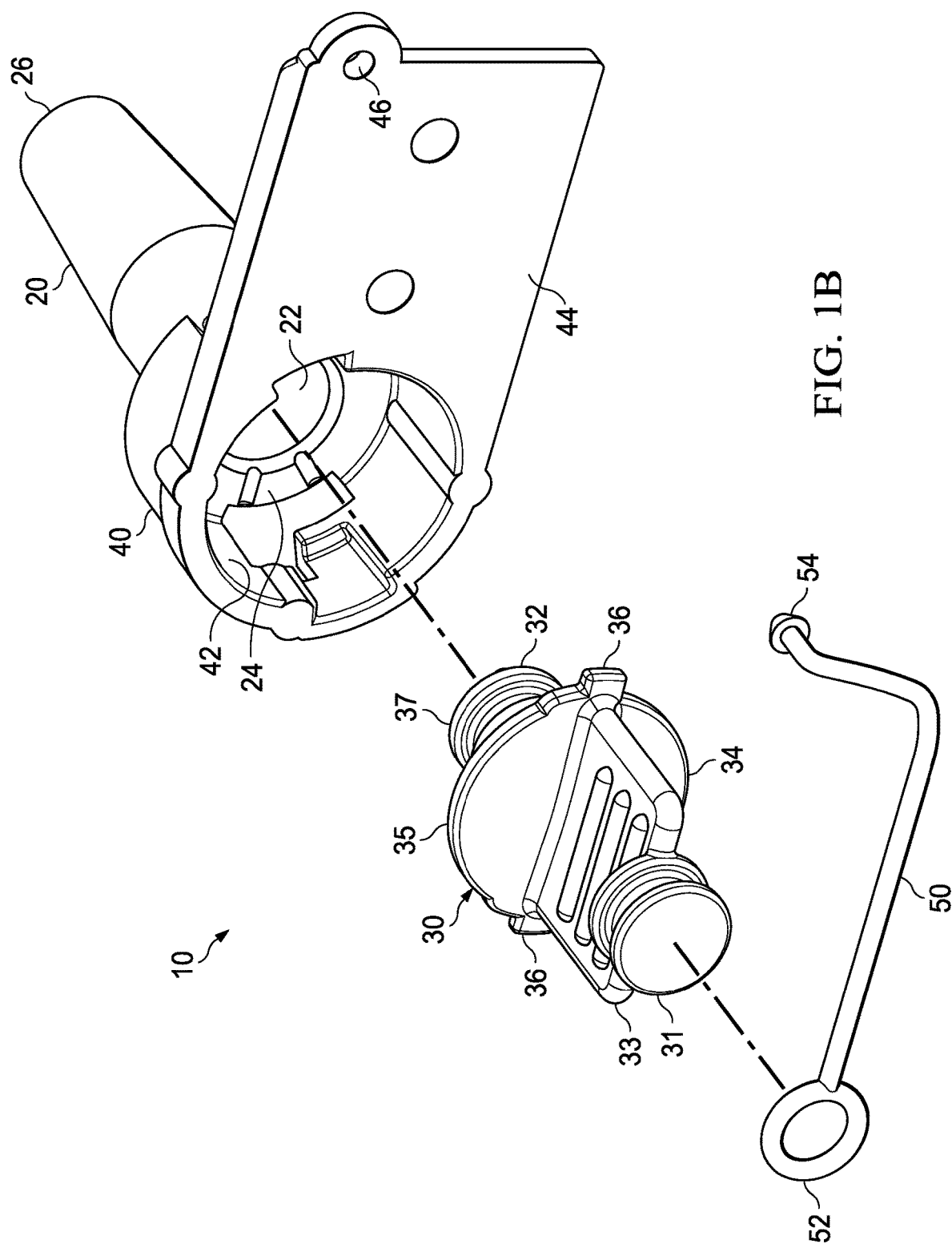
FIG. 1B is an exploded front perspective view of the FIG. 1A embodiment.

FIGS. 1A and 1B provide, respectively, an assembled and an exploded front perspective view of a first embodiment of a child-resistant drain valve. This child-resistant drain valve is configured as a device 10 for selectively opening or closing a drain opening of a tank that contains a liquid. The device 10 comprises a body 20 that engages the tank and provides a liquid communication to the exterior for any fluid in the tank, a plug 30 that is frictionally engaged in the body, a means 40 for restricting the movement of the plug in the body and a tether 50 that is used to keep the plug in close association with the body. A further desirable intention of the tether is to prevent (or at least deter) ingestion of the plug 30 by a child.

The body 20 is depicted in FIGS. 1A and 1B as being generally cylindrical, with an axial conduit passing from a first end 24 to second end 26. The conduit is obstructed from view in FIG. 1A by the plug 30, but it is visible in FIG. 1B when the plug is separated from the body. If the external diameter of the body 20 decreases, it is preferred that the larger diameter is at the first end 24, as it is the first end that will be located at the exterior of the tank or the device in which the tank is located, which can be a water cooler, as an example. The shape of body 20 would suggest that the most likely manner of forming it would be by a molding process and that the body would be formed from a thermoplastic material, especially a thermoplastic that exhibits stability and durability over a range of temperatures from about 5 C to about 90 C, although it may be that the device 10 would be provided in both a "hot water" and a "cold water" model, in which a narrower range of temperature would be expected to be encountered. While not specifically depicted in FIGS. 1A and 1B, the conduit 22 may be adapted along its length with means for assisting a frictional purchase of the plug when it is inserted.

The plug 30 is shown inserted into, and engaged with, the body 20 in FIG. 1A, and it is shown removed from the body in FIG. 1B. Moving from a first end 31 to a second end 32, the plug 30 has a distinct axis and has several distinct sections. At the first end 31, a round protuberance 33 allows the plug 30 to be attached to the tether 50. Moving axially toward the second end 32, there is a gripper section 34 that facilitates manual rotation of the plug about its axis. The gripper section 34 is characterized in this embodiment by being essentially planar, where the axis of the body lies in the plane. Abutting the gripper section 34 is a circular flange 35 with a pair of tangs 36, preferably in diametrically-opposed relationship. The circular flange is characterized by being essentially planar, but the plane lies normal to the axis of the body. Beyond the circular flange 35 is a cylindrical section 37 that terminates at the second end. In some instances, and depending upon the material selected for plug 30, it may be desirable to place an O-ring on cylindrical section 37 so that it is compressed between the body 20 and the plug as the plug is engaged. For purposes of reference in FIGS. 2A through 2G, note that tangs 36 lie essentially in the plane of the gripper section 34.

A means 40 for restricting the movement of the plug 30 in the body 20 is provided by several parts that are on the plug and body. More detail of the parts will be provided with regard to FIGS. 2A through 2G, but the major features are a cage 42 that is preferably formed co-axially onto the first end 24 of the body and the circular flange 35 of the plug. A rectangular flange 44 that extends from the cage 42 does not operate as a part of the means for restricting movement as much as it provides a gripping means for mounting the device 10 into the tank or removing the device therefrom. A hole 46 in the rectangular flange 44 provides a site for anchoring an end of tether 50. Flange 44 would typically be formed as an integral part of the body 20.

Tether 50 is a flexible elongate member in the nature of a ligament that is used to keep the body 20 and plug 30 in relative proximity when the plug is disengaged from the body. Tether 50 has a bight 52 formed at a first end and a knob 54 formed at a second end. The bight 52 can be placed over protuberance 33 and knob 54 can be secured into hole 46. Tether 50 is preferably formed of an elastomer, as is plug 30. In some instances, tether 50 can be integrally formed with the rectangular flange 44, although this should only be done in circumstances where the integral formation does not compromise the flexible nature of the tether.

Figure 2A:
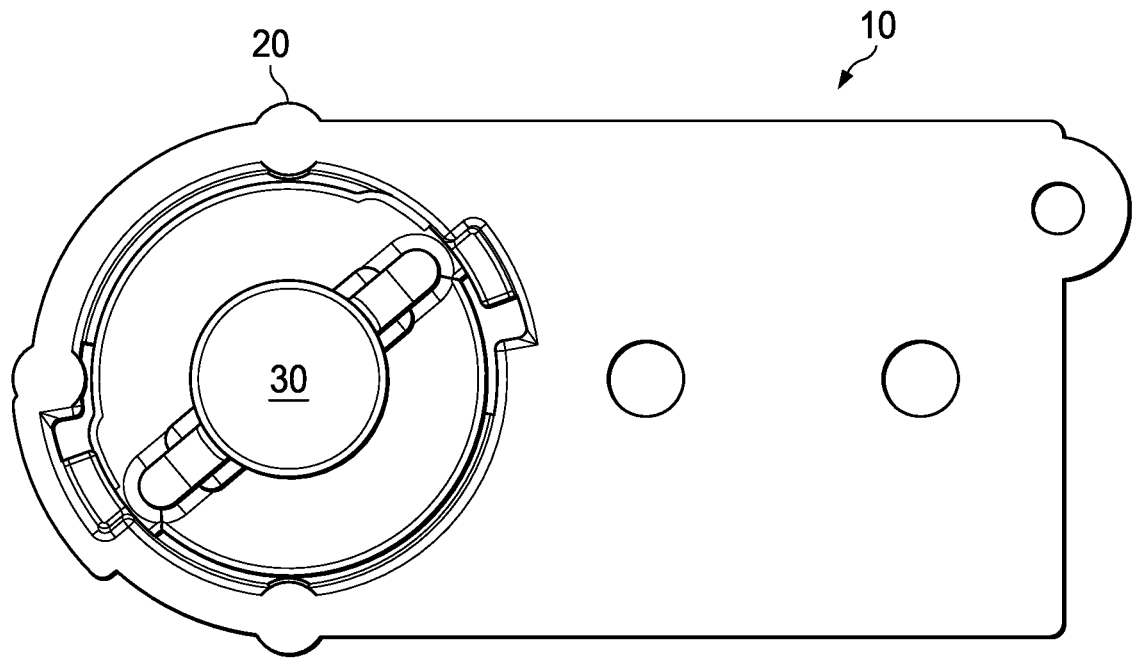
FIG. 2A is a front elevation view of the FIG. 1A embodiment wherein the drain plug is in a closed position.
Figure 2B:
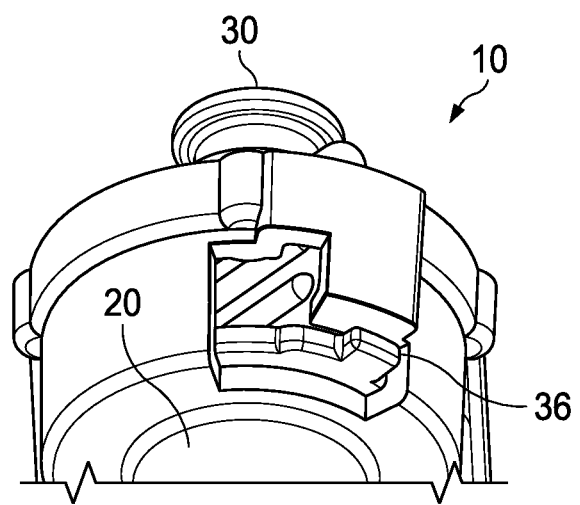
FIG. 2B is a bottom perspective view of the FIG. 2 embodiment.

FIGS. 2A through 2G demonstrate how the plug 30 can be manipulated in the body 20. FIG. 2A is a front elevation view with the plug 30 fully engaged and FIG. 2B shows a top perspective view of the same situation. Notable in these figures is the fact that the tangs 36 (one is visible in FIG. 2B, neither are visible in FIG. 2A) and the circular flange 35 constrain the axial movement of the plug 30 in the body. Also, these figures show the process without the tether being in place, so as not to obstruct the view.

Figure 2C:
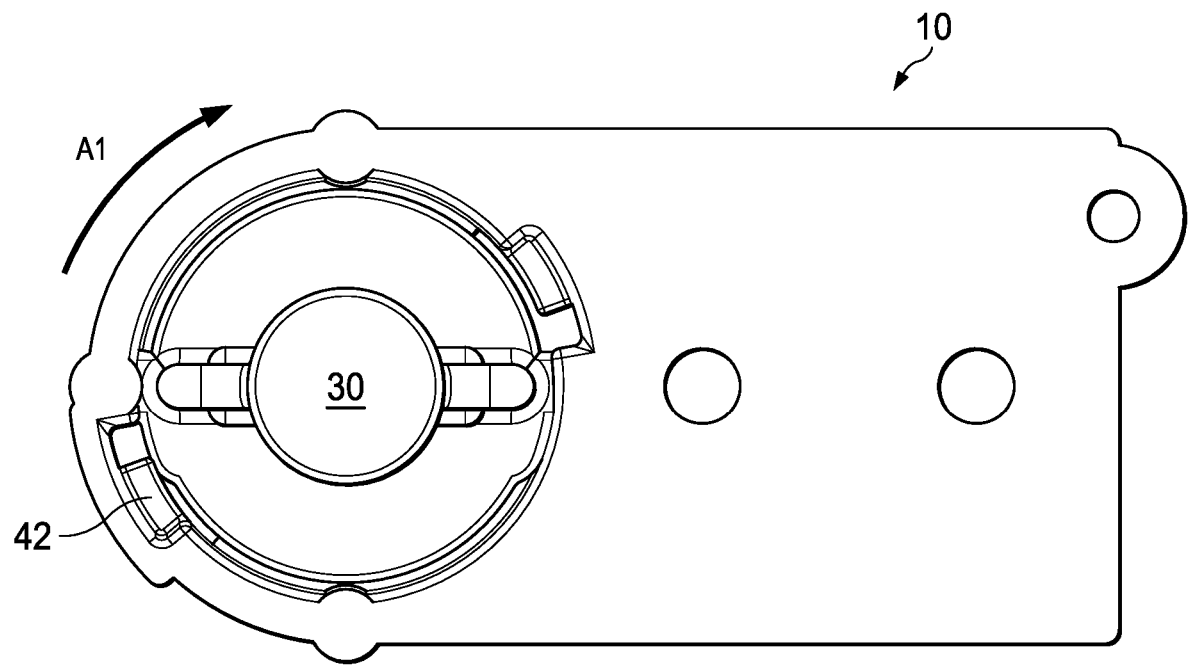
FIG. 2C is a front elevation of the FIG. 1 embodiment wherein the drain plug is in an intermediate position.

FIG. 2C illustrates, in front elevation view, a first step in removing the engaged plug 30 of FIG. 2A from the body 20. In this step, arrow A1 shows a clockwise rotation of the plug 30. The complete rotation permitted by cage 42 is about 90°, although FIG. 2C shows the plug 30 (as seen in gripper section 34) only partially rotated through the range. At the end of the rotational range, it is desirable for the cage 42 to provide a detent for the tangs 36, facilitating a "feel only" removal of the plug 30.

Figure 2D:
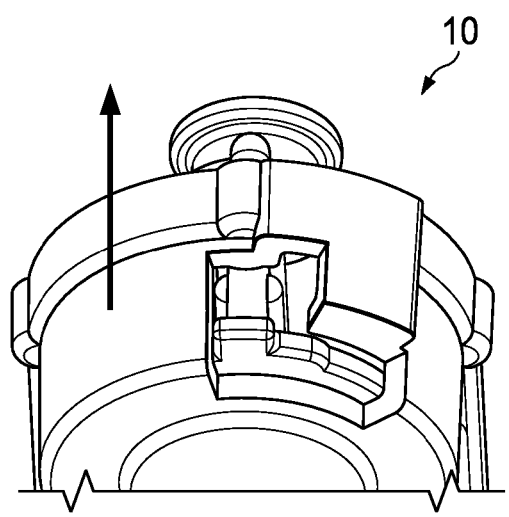
FIG. 2D is a bottom perspective view of the FIG. 2B embodiment.

FIG. 2D is a top perspective view showing the second step of removing the plug 30. At the end of the clockwise rotation, the plug 30 can move axially outward a small distance, pulling the circular flange 35 out of contact with the first end 24 of body 20. Again, the cage 42 should be provided with a detent that constrains further axial movement of at least the tangs 36 and possibly also the circular flange.

FIG. 2E is a front elevation view showing the third step for removing the plug 30 form body 20. Here, a counter-clockwise rotation, typically of about 90°, occurs in a portion of the cage after the plug has been advanced axially in the second step. At the end of this rotation, slots in the front face of the cage 42 allow the tangs 36 to be seen. As with the other steps, a detent in the cage is useful in providing tactile indication of the position.

FIGS. 2F and 2G are, respectively, a bottom perspective and a top perspective view of the fourth and final step of removing the plug 30 from body 20. Here, the gripper section 34 is used to withdraw the plug 30 axially from the cage 42 and the body 20.

Figure 3A:
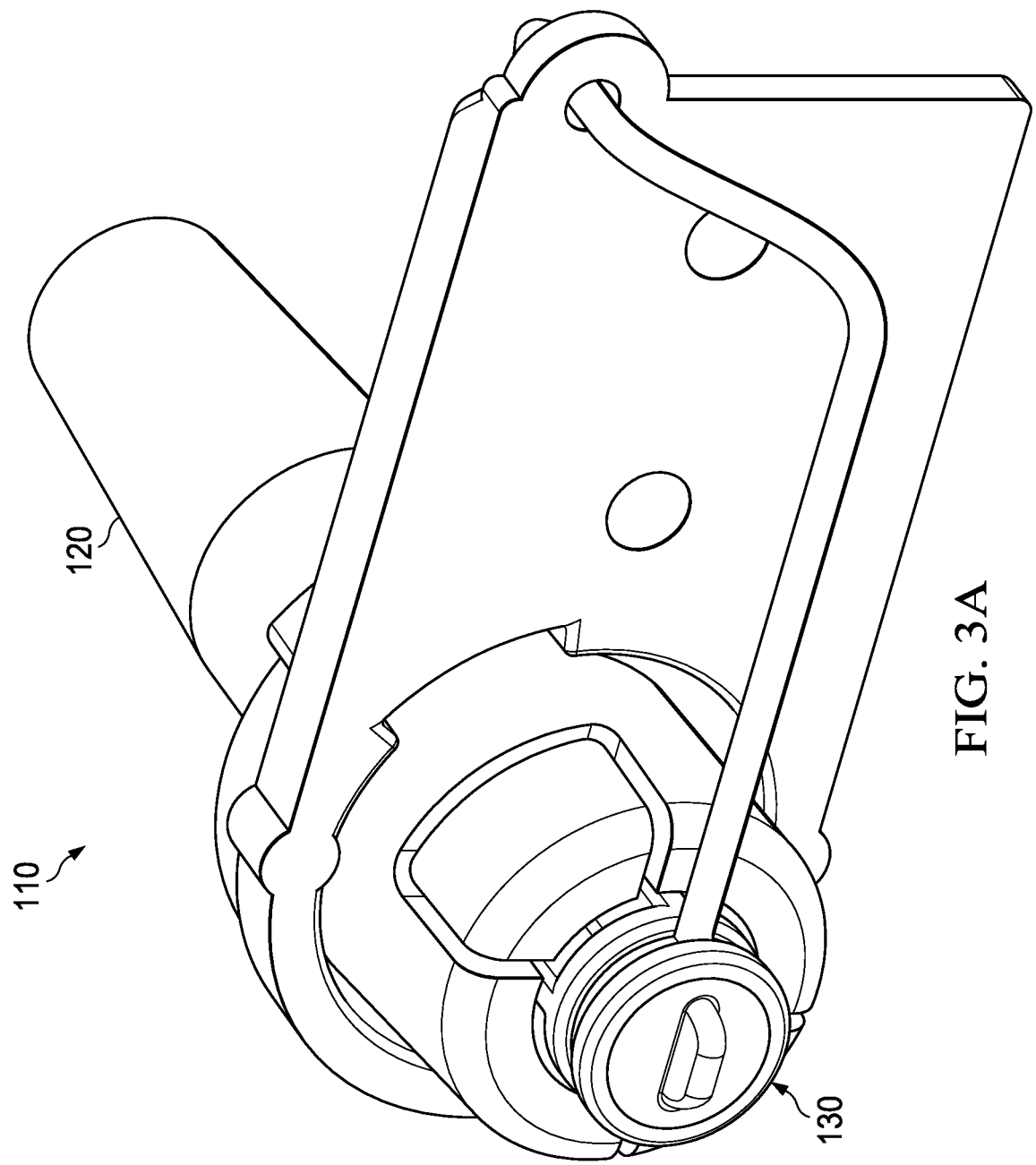
FIG. 3A is a front perspective view of a second embodiment of a child resistant drain valve.
Figure 3B:
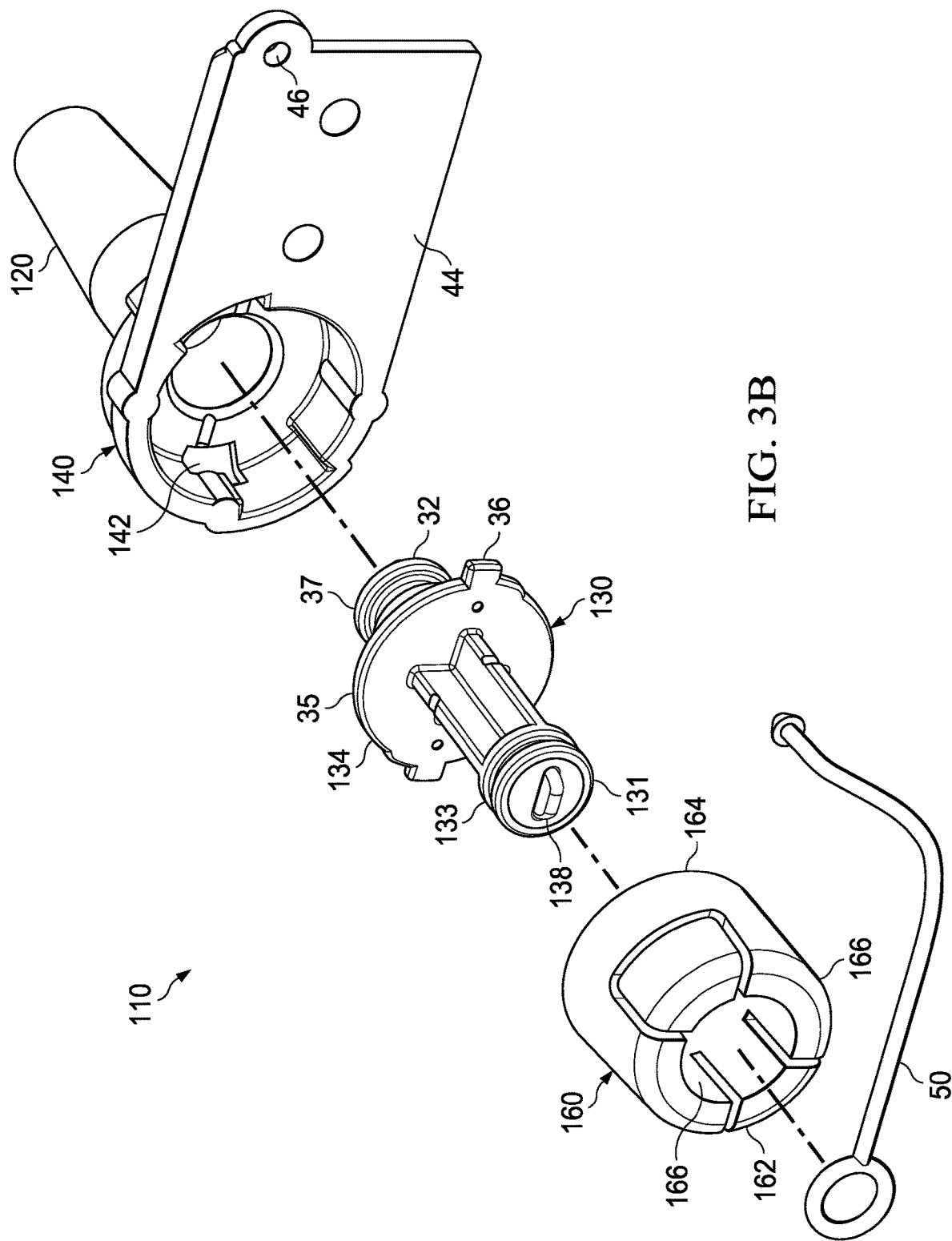
FIG. 3B is an exploded front perspective view of the FIG. 3A embodiment.

FIGS. 3A and 3B provide, respectively, an assembled and an exploded front perspective view of a second embodiment of a child-resistant drain valve. This child-resistant drain valve is configured as a device 110 for selectively opening or closing a drain opening of a tank that contains a liquid. The device 110 comprises a body 120 that engages the tank and provides a liquid communication to the exterior for any fluid in the tank, a plug 130 that is frictionally engaged in the body, a means 140 for restricting the movement of the plug in the body. As with the first embodiment, a tether 50 is provided to keep the plug 130 in close association with the body 120.

Body 120, as depicted in FIGS. 3A and 3B, is generally cylindrical, with an axial conduit 22 passing from a first end 24 to a second end 26. The conduit 22 is obstructed from view in FIG. 3A by the plug 130, but it is visible in FIG. 3B when the plug is separated from the body. If the external diameter of the body 120 decreases, it is preferred that the larger diameter is at the first end 24, as it is the first end that will be located at the exterior of the tank or the device in which the tank is located. The shape of body 120 would suggest that the most likely manner of forming it would be by a molding process and that the body would be formed from a thermoplastic material, especially a thermoplastic that exhibits stability and durability over a range of temperatures from about 5 C to about 90 C, although it may be that the device 110 would be provided in both a "hot water" and a "cold water" model, in which a narrower range of temperature would be expected to be encountered. While not specifically depicted in FIGS. 3A and 3B, the conduit 22 may be adapted along its length with means for assisting a frictional purchase of the plug 130 when it is inserted.

The plug 130 is shown inserted into, and engaged with, the body 120 in FIG. 3A, and it is shown removed from the body in FIG. 3B. Moving from a first end 131 to a second end 132, the plug 130 has a distinct axis and has several distinct sections. At the first end 131, a round protuberance 133 allows the plug 130 to be attached to the tether 50. Moving axially toward the second end 32, there is a gripper section 134. Unlike gripper section 34 of the first embodiment 10, this gripper section 134, as best viewed in FIG. 3B, is intended for indirect manual rotation of the plug about its axis. This indirect rotation is achieved through an annular cap 160, which is described in more detail below. The gripper section 134 is characterized in device 110 by a plurality of axial vanes that provide the gripping surfaces. As in gripper section 34, the gripper section 134 is abutted by a circular flange 35 with a pair of tangs 36, preferably in diametrically-opposed relationship. The circular flange 35 is characterized by being essentially planar, but the plane lies normal to the axis of the body. Beyond the circular flange 35 is a cylindrical section 37 that terminates at the second end 132. In some instances, and depending upon the material selected for plug 130, it may be desirable to place an O-ring on cylindrical section 37 so that it is compressed between the body 120 and the plug as the plug is engaged. Note that the protuberance 133 has a raised line 138 that is essentially aligned with tangs 36, providing a visual indicator of the alignment of the tangs 36, as they are normally obscured by annular cap 160.

A means 140 for restricting the movement of the plug 130 in the body 120 is provided, in addition to parts that are on the plug and body, by the annular cap 160. This annular cap 160 is generally cylindrical and is preferably formed from a rigid polymer, specifically, a thermoplastic. The annular cap 160 is divided at a first end 162 by a pair of intersecting radial cuts that divide the first end into four sectors 164 that surround the annular opening 166. The radial cuts extend only through about one-half of the axial height of the cap 160. When the plug 130 is inserted into the annular cap, protuberance 133 extends axially therefrom. The means 140 for restricting has a cage 142 that is preferably formed co-axially onto the first end of the body and the circular flange 35 of the plug 130. A rectangular flange 44 that extends from the cage 142 does not operate as a part of the means for restricting movement as much as it provides a gripping means for mounting the device 110 into the tank or removing the device therefrom. A hole 46 in the rectangular flange 44 provides a site for anchoring an end of tether 50. Flange 44 would typically be formed as an integral part of the body 120.

Figure 4:
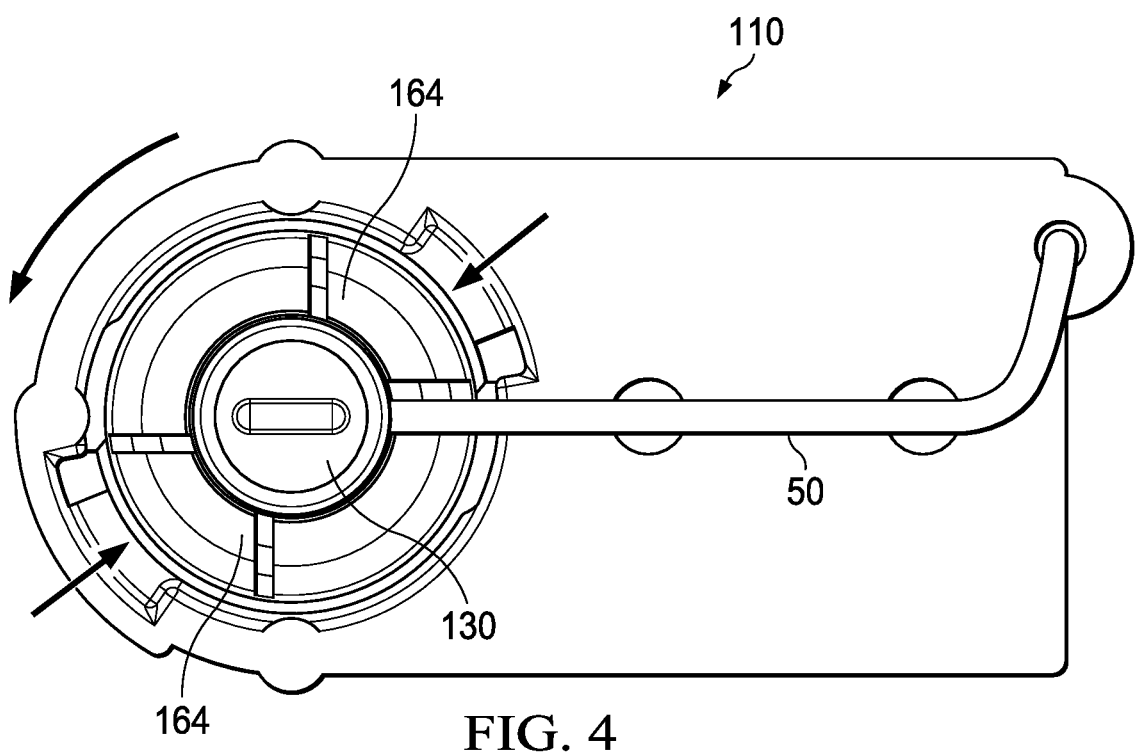
FIG. 4 is a front elevation view of the FIG. 3 embodiment wherein the drain plug is in a closed position.

Operation of the second embodiment device 110 is shown in the front elevation view of FIG. 4. In a first step, a user depresses a diagonally-opposed pair of the sectors 164, resulting in the annular cap engaging the plug 130, especially at the gripper section 134. While continuing to depress the selected sectors 164, the user rotates the annular cap 160 in a counterclockwise direction, disengaging the tangs 36 (not seen in FIG. 4) from the cage 142, removing a restraint against axial movement, so that the plug and annular cap are removable, as a unit, from the body 120.

It should be immediately recognized that this counter-clockwise rotation is preferred, to comply with the so-called "right hand rule" for opening or closing valves and the like by a rotational motion. However, the rotation can be reversed by selecting a proper configuration of the cage 142, which may be desirable in some cultures where a "left hand rule" is observed.

With instruction, the foregoing steps related to disengagement of the plug 130 would not be difficult for an adult to execute. However, these steps are likely too complex for a young child to figure out, and the young child would probably not be able to apply sufficient force to disengage the plug 130 and annular cap 160.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A device for selectively opening or closing a drain opening of a tank for containing a liquid, the device comprising:

a body, adapted for engagement into the drain opening, the body having a conduit running therethrough;

a plug, comprising an elastomeric material, sized and shaped for frictional engagement in the conduit;

a cage formed at a first end of the body and provided with a plurality of openings and detents that engage the plug and limit rotation of the plug therein, the cage interacting with at least two tangs formed on the plug that engage the openings in the cage and with complementary elements disposed on the body, such that, in a first rotational position, the plug is axially retained relative to the conduit and, in a second rotational position, the plug is not restricted from axial movement out of the conduit; and a tether, adapted at a first end to be retained on the plug and adapted at a second end to be retained by the body;

a rectangular flange that extends radially from the body, with an opening in the rectangular flange that provides an anchor point for the second end of the tether; and an annular cap, having a through-hole from which an end of the plug extends, the annular cap comprising means for co-acting with the plug to engage the cap in the body, such that, in a first rotational position, the cap is axially retained relative to the conduit and, in a second rotational position, the cap is not restricted from axial movement away from the body, so that the tether and the plug co-act to retain the annular cap;

wherein engaging or disengaging the plug from the body requires at least one clockwise rotation and at least one counterclockwise rotation of the plug in the body to engage or disengage the tangs of the plug in the openings of the cage.

2. The device of claim 1, wherein:

the annular cap comprises a thermoplastic.

3. The device of claim 2, wherein:

the annular cap is divided by radial cuts into a plurality of sectors, such that, when the annular cap in positioned atop the plug, manual compression of at least two sectors by a user, followed by rotation of the annular cap, causes co-rotation of the plug in the cage.

4. The device of claim 1, wherein:

the body has an external diameter that decreases from a first end, into which the plug is inserted, to a second end.

5. The device of claim 1, wherein:

the body comprises a thermoplastic material.

\* \* \* \* \*